United States Patent
Ishihara et al.

(10) Patent No.: US 6,430,372 B2
(45) Date of Patent: Aug. 6, 2002

(54) IMAGE DATA RECORDING METHOD AND FRAME IMAGE REGENERATING METHOD

(75) Inventors: Atsuhiko Ishihara; Makoto Nakazawa, both of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 42 days.

(21) Appl. No.: 09/730,397

(22) Filed: Dec. 6, 2000

Related U.S. Application Data

(62) Division of application No. 09/258,823, filed on Feb. 26, 1999, now Pat. No. 6,181,880.

(30) Foreign Application Priority Data

Feb. 27, 1998 (JP) .............................................. 10-48296

(51) Int. Cl.$^7$ ........................... G03B 7/24; G03B 17/26; H04N 7/18
(52) U.S. Cl. ....................... 396/208; 396/321; 396/512; 348/96
(58) Field of Search ................................ 396/207, 208, 396/211, 310, 321, 429, 512; 348/96, 97, 110; 358/506

(56) References Cited

U.S. PATENT DOCUMENTS

| | | | |
|---|---|---|---|
| 5,032,855 A | * | 7/1991 | Taniguchi et al. .......... 396/321 |
| 5,349,401 A | * | 9/1994 | Bryant ....................... 396/207 |
| 5,640,201 A | | 6/1997 | Inuiya |
| 5,808,667 A | | 9/1998 | Sugiyama |

* cited by examiner

*Primary Examiner*—Alan A. Mathews

(57) ABSTRACT

An image data recording method for recording, in an IC memory mounted in a film cartridge, image data of one or more desired frames on developed photographic film stored in the film cartridge is provided. The image data recording method comprises the steps of: determining the residual capacity of IC memory, changing the quantity of image data of one or more desired frames to be recorded in the IC memory or erasing the data recorded in the IC memory in accordance with the determined residual capacity of IC memory, and recording the image data of one or more desired frames in the residual capacity of the IC memory.

3 Claims, 13 Drawing Sheets

F I G. 3
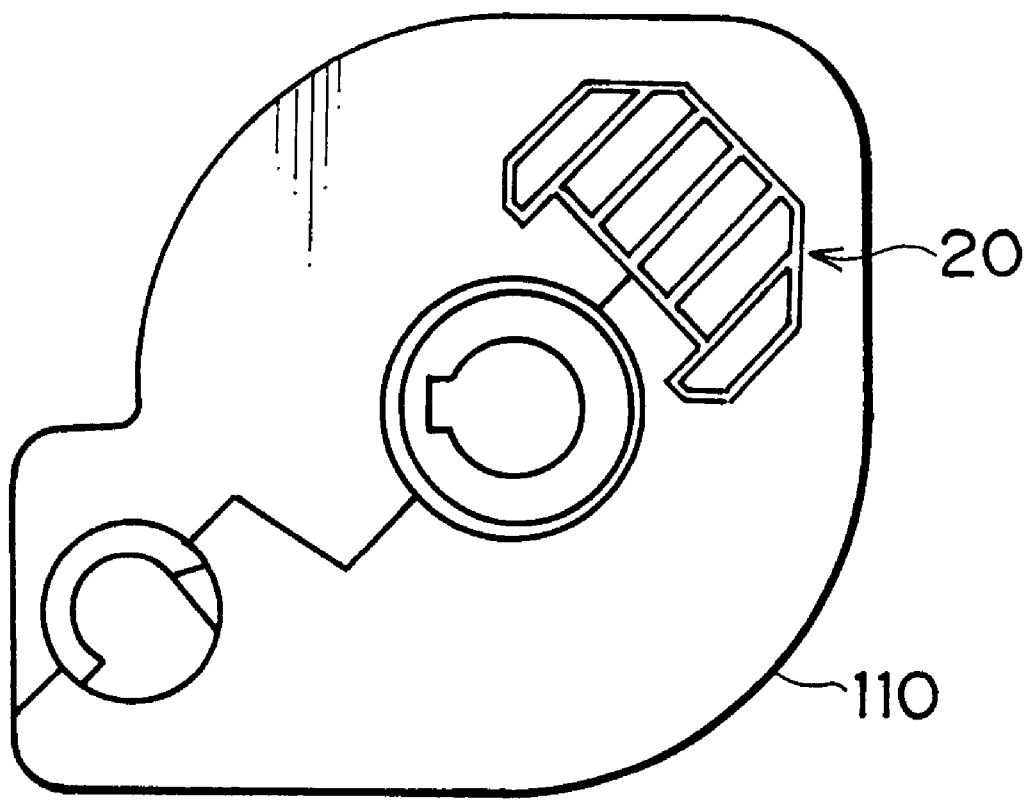

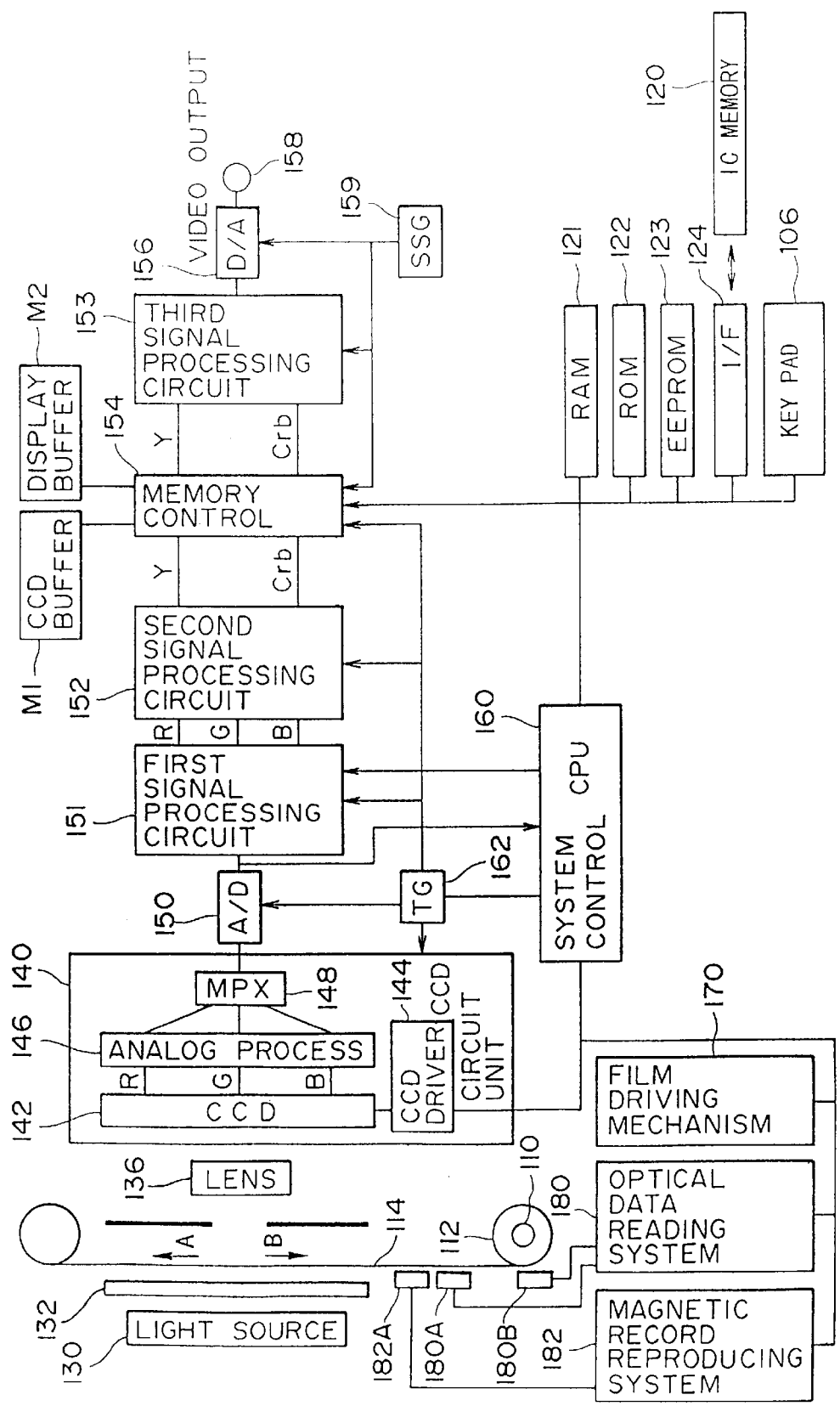

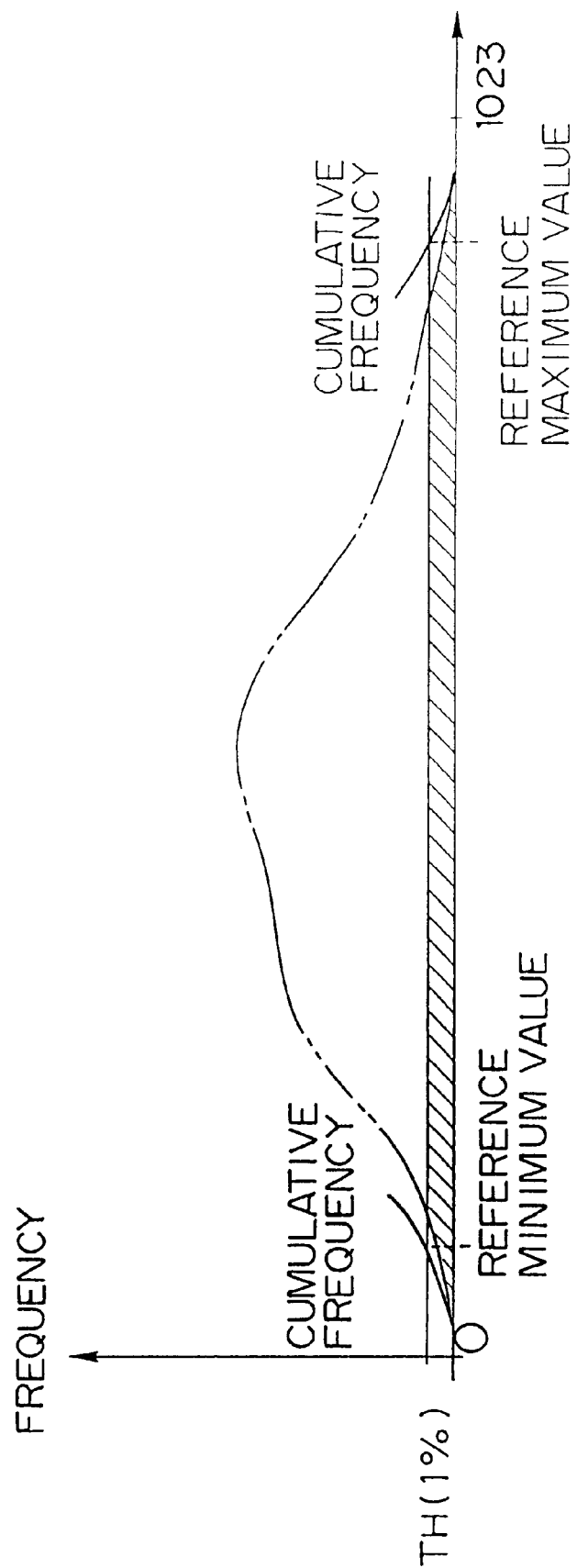

F I G. 8
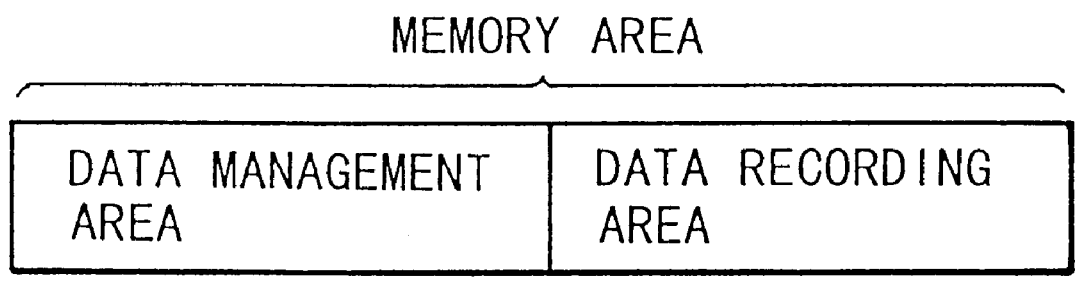

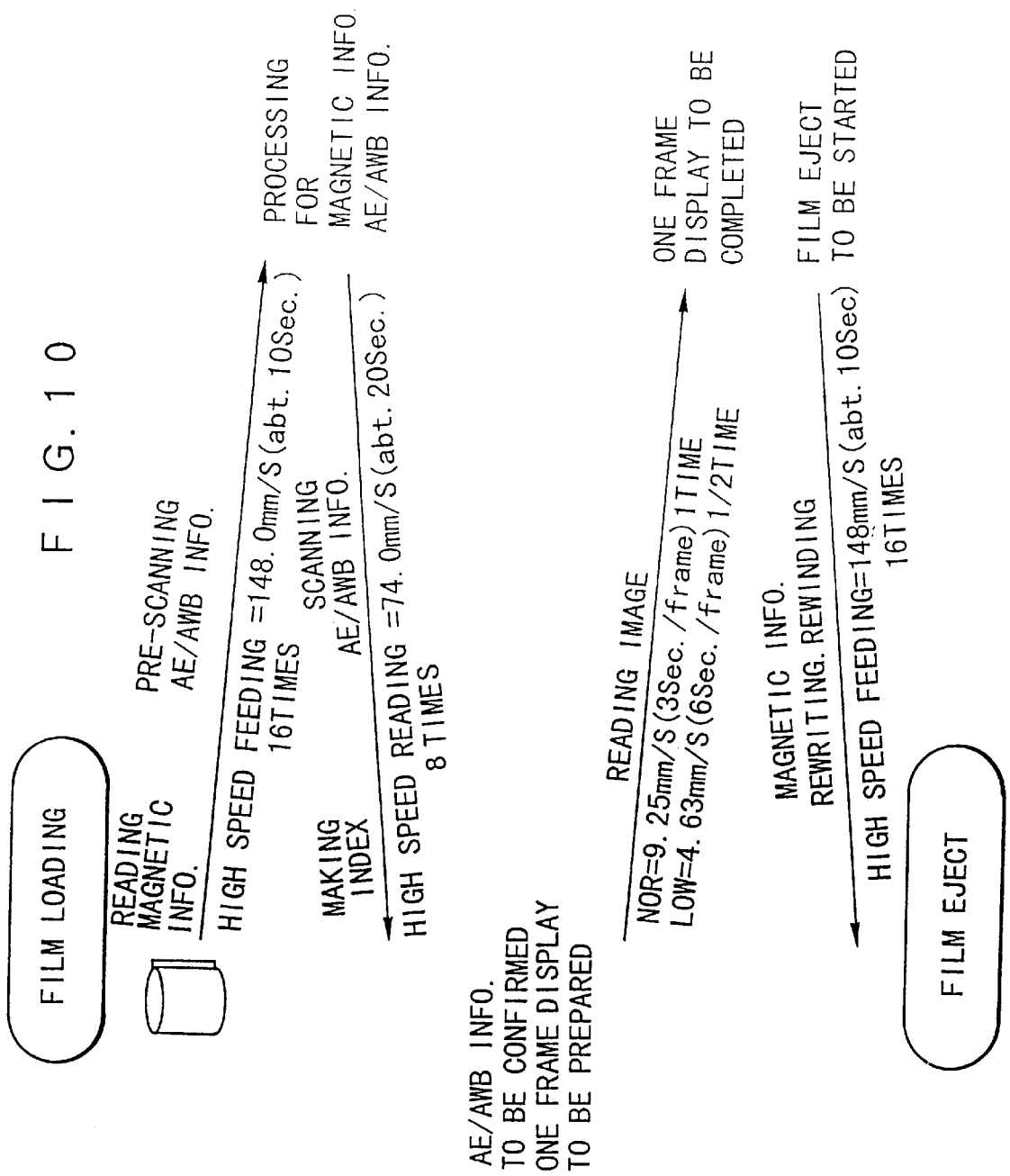

F I G. 1 1
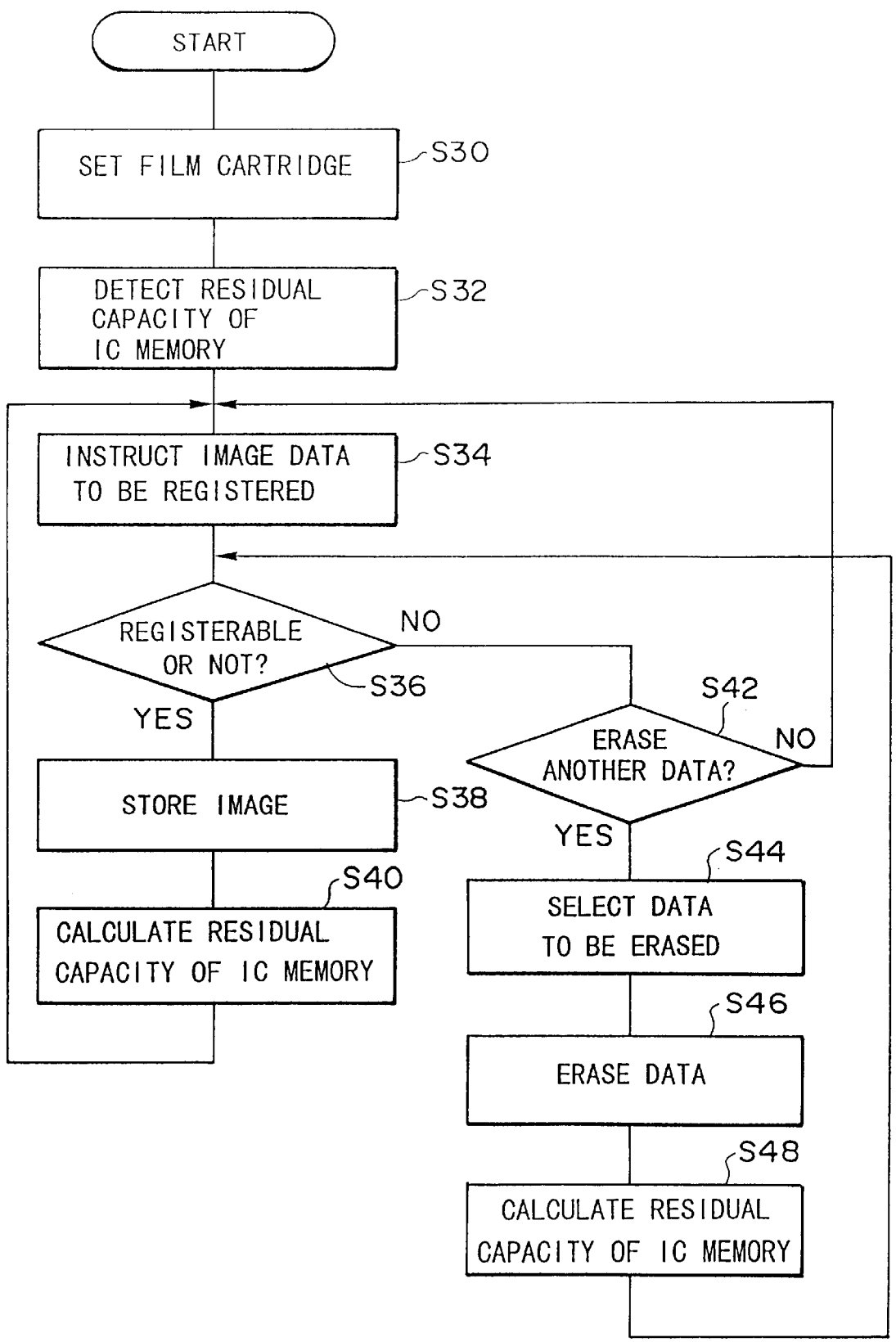

IMAGE DATA RECORDING METHOD AND FRAME IMAGE REGENERATING METHOD

This application is a divisional of application Ser. No. 09/258,823, filed on Feb. 26, 1999, now U.S. Pat. No. 6,181,880 the entire contents of which are hereby incorporated by reference.

BACKGROUND OF THE INVENTION

1. Field of the Invention

The present invention relates generally to an image data recording method and a frame image regenerating method, and more particularly to an image data recording method and a frame image regenerating method which display film images on a monitor within a short period of time by using data in an IC memory loaded in a film cartridge.

2. Description of Related Art

Recently, an Advanced Photo System (APS) film has been proposed as a new photographic film. A magnetic layer is coated on the surface of the APS film, and photographic information, printing information, etc. are magnetically recorded on the film. The APS film is stored in a film cartridge in the state wherein the film is completely shielded. After the photography, the developed film, which is stored in the film cartridge, is returned from a laboratory.

There is a conventional APS film cartridge loaded with an IC memory. The IC memory is capable of containing a lot of information which cannot be magnetically recorded on the film. Moreover, it is possible to immediately read the information recorded in the IC memory without removing the film from the film cartridge.

On the other hand, a film player is known which images a developed film by an image sensor such as a CCD and converts a film image into an image signal, which is output to a TV monitor that displays the film image. There is also proposed a film player, which records and regenerates with respect to the APS film, and a film player which writes and reads the data with respect to the IC memory loaded in the APS film cartridge.

If the film player displays the images on the APS film on a TV monitor, it is necessary to remove the film from the APS film cartridge and feed the film in order to image each frame image. For this reason, tension and friction are applied to the film, and, thus, regenerating frame images repeatedly would deteriorate the film.

If the film player displays the images on the APS film on the TV monitor, the image data of all frames is acquired in pre-scanning to obtain information such as the brightness and white balance of each frame. In accordance with the information, main scanning is performed for each frame and the image data acquired by the main scanning is processed appropriately and displayed on the TV monitor. Accordingly, the film must be fed reciprocally a plurality of times during one regeneration. This is a heavy stress on the film, and it takes a long time to regenerate the images.

To solve the above-mentioned problem, a film cartridge with IC memory has been proposed in which the image data of each frame is recorded in the IC memory and in which, when the film player regenerates the film image, the image data of each frame is read from the IC memory and is displayed on the TV monitor without removing the film from the film cartridge. This reduces stress on the film and shortens the regeneration time of the film image.

The IC memory is mounted in the film cartridge within a limited space, and thus, there is a limitation on the capacity of the memory. At present, it is difficult to record, in the IC memory, the image data of all frames with the quantity that can be processed by the film player. It is necessary to reduce and compress the image data in order to decrease the quantity of the image data that is recorded in the IC memory.

SUMMARY OF THE INVENTION

The present invention has been developed to address the above-described circumstances. An object of the invention is the provision of an image data recording method which records image data of one or more desired frames in accordance with the residual capacity of the IC memory loaded in the film cartridge. A second object of the invention is the provision of a frame image regenerating method records, in the IC memory, the data used to process the image during the regeneration, in order to eliminate the necessity for scanning the film when the film image is regenerated. The invention thereby prevents the deterioration of the film and displays the desired frame images on a monitor within a short period of time.

To achieve the above-mentioned object of image data recording method, the present invention is directed to a method for recording, in a storage medium attached to a film cartridge, image data of at least one desired frame on a developed photographic film stored in the film cartridge. The image recording method comprises the steps of: determining a residual memory capacity of the storage medium; changing a quantity of image data of the desired frame to be recorded in the storage medium or erasing data recorded in the storage medium in accordance with the residual memory capacity of the storage medium; and allowing the image data of the desired frame to be recorded within the residual memory capacity of the storage medium.

The image data recording method further comprises the steps of: calculating the number of frames which are permitted to be recorded in the storage medium in accordance with the residual memory capacity of the storage medium and the quantity of image data for one frame to be recorded; and displaying the calculated number of frames.

The image data recording method further comprises the step of arbitrarily changing the quantity of image data in each frame so that the quantity of the image data can be recorded in the storage medium.

The image data recording method further comprises the step of reducing and/or compressing the image data to thereby change the quantity of the image data.

According to the present invention, the image data of each frame is recorded in the storage medium loaded in the film cartridge, and thus, the image of each frame is regenerated without extracting the film from the film cartridge. This prevents the deterioration of the film and reduces the regeneration time of the frame image. The quantity of the image data of each frame is changed in accordance with the residual memory capacity of the storage medium, and it is therefore possible to arbitrarily set the number and quality of frame images recorded in the storage medium.

To achieve the above-mentioned object of a frame image regenerating method, the present invention is directed to a method comprising the steps of: using a film cartridge with a storage medium mounted therein, the storage medium containing setup data comprising an exposure time $T_0$ of an electronic shutter for imaging a negative base on a developed photographic film stored in the film cartridge at a predetermined brightness, an exposure time $T_i$ of the electronic shutter for regenerating each frame image on the photographic film at a proper brightness, where i is a frame number, and color correction data for regenerating each frame image on the photographic film in a proper color; reading the setup data recorded in the storage medium, finding an exposure time $T'_0$ of the electronic shutter for imaging the negative base on the film at a predetermined brightness, and calculating an exposure time $T'_i$ for regenerating each frame image at a proper brightness in accordance with the following equation:

$$T'_i = T'_0/T_0 \times T_i,$$

whereby regenerating each frame image on the photographic film in accordance with the calculated exposure time $T'_i$ of the electronic shutter and the color correction data of the setup data.

In the frame image regenerating method, the color correction data comprises reference maximum values $R_{max}$, $G_{max}$ and $B_{max}$ and reference minimum values $R_{min}$, $G_{min}$ and $B_{min}$ of gradations in R, G and B colors.

The frame image regenerating method further comprises the steps of: recording, in the storage medium, convergent values $R_0$, $G_0$ and $B_0$ of gradations in R, G and B colors in the case in which the negative base on the photographic film is imaged in the exposure time $T_0$ of the electronic shutter; determining convergent values $R'_0$, $G'_0$, $B'_0$ of gradations in R, G and B colors in the case in which the negative base on the photographic film is imaged in the exposure time $T'_0$ of the electronic shutter during the regeneration of frame images on the photographic film; and calibrating the reference maximum values $R'_{max}$, $G'_{max}$ and $B'_{max}$ and the reference minimum values $R'_{min}$, $G'_{min}$ and $B'_{min}$ of gradations in R, G and B colors during the regeneration of each frame in accordance with the following equations:

$$R'_{max} = R'_0/R_0 \times R_{max};$$

$$G'_{max} = G'_0/G_0 \times G_{max}; \text{ and}$$

$$B'_{max} = B'_0/B_0 \times B_{max}.$$

According to the present inventions, the setup data required for regenerating the frame images is recorded in the storage medium loaded in the film cartridge, and the setup data is referred to during the regeneration of the frame images. It is therefore possible to immediately perform the main scanning for each frame without pre-scanning the film. This prevents the deterioration of the film and reduces the regeneration time of the frame images. Moreover, the setup data is calibrated in accordance with the information acquired by imaging the negative base. Consequently, it is possible to properly regenerate the image in each frame according to the setup data recorded in the storage medium even if there is a change in the apparatus as time passes or even if the different apparatuses record the setup data and regenerate the image in the storage medium.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a view illustrating the side of a film cartridge applied to the film player in FIG. 1;

FIG. 4 is a block diagram illustrating an embodiment of the inner structure of the film player in FIG. 1;

FIG. 5 is a histogram used for assistance in explaining how to fine a reference maximum value and a reference minimum value;

FIG. 8 is a view illustrating the specification of a memory area of an IC memory;

FIG. 10 is a view illustrating an example of a transport sequence of a film transported in the film player;

FIG. 11 is a flow chart showing a procedure for recording image data in the IC memory;

DETAILED DESCRIPTION OF THE PREFERRED EMBODIMENT

This invention will be described in further detail by way of example with reference to the accompanying drawings.

Figure 1:
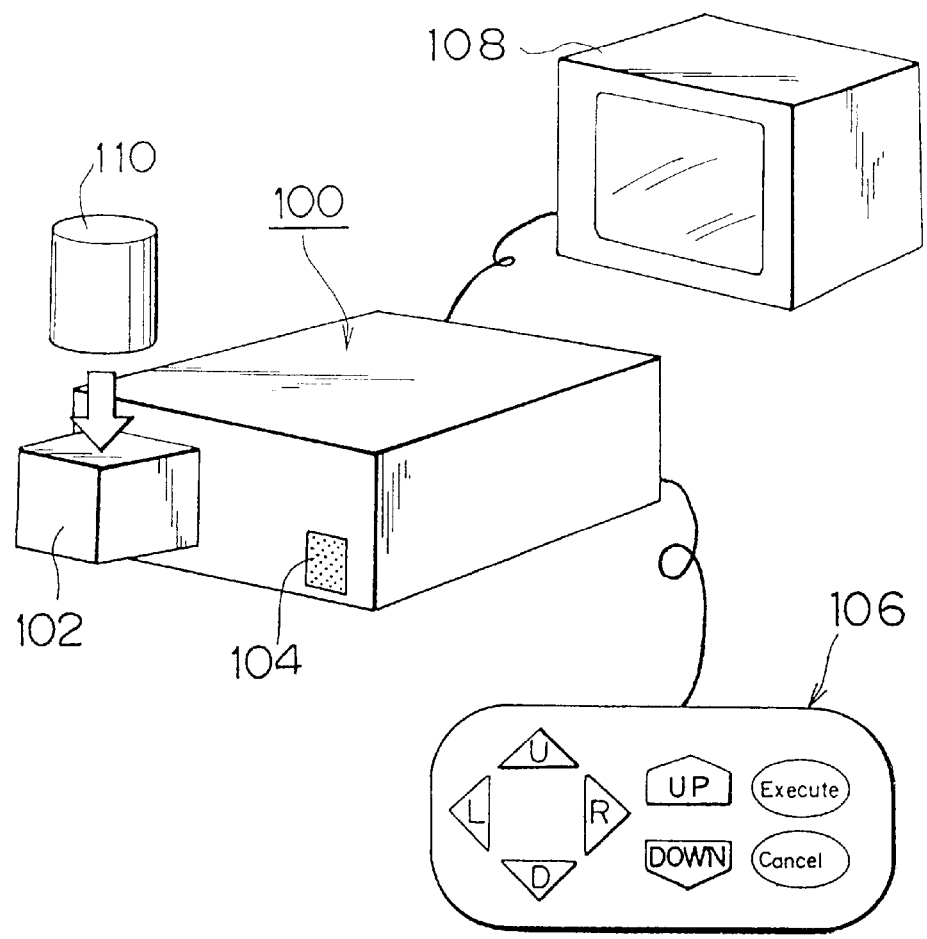
FIG. 1 is a view illustrating the structure of the whole system including a film player, to which a film image input method of the present invention is applied.

FIG. 1 is a perspective view illustrating the overall structure of a film player according to the present invention. As shown in FIG. 1, the film player 100 is rectangular parallelepiped, and a film cartridge storage part 102 and a power supply switch 104 are provided at the front of the film player 100. The film cartridge storage part 102 is driven forward and backward in loading/unloading directions of a film cartridge 110, so that the film cartridge 110 can be stored and taken out.

The film player 100 connects to a keypad 106 and a TV monitor 108. The keypad 106 outputs a variety of control signals to the film player 100 in order to control the film player 100. The film player 100 outputs a video signal to the TV monitor 108.

Figure 2:
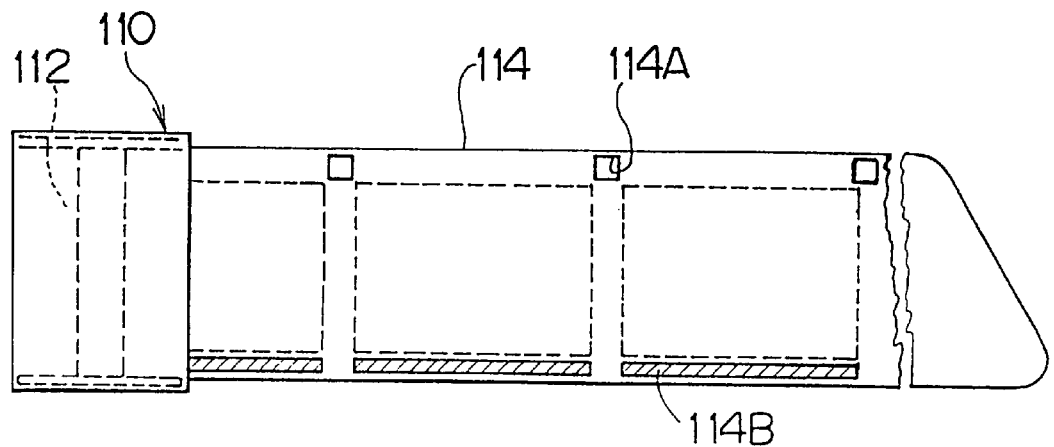
FIG. 2 is a view illustrating an example of a film cartridge applied to the film player in FIG. 1.

As shown in FIG. 2, the film cartridge 110 has a single spool 112, and a photographic film 114 is wound around the spool 112. Perforations 114A, which indicate the positions of frames, are punched in the photographic film 114, and a magnetic recording layer 114B is formed on the entire surface or the edge of the film. A camera with a magnetic head records, on the magnetic recording layer 114B, magnetic data representing photographic data for each frame. The developed photographic film 114 is wound up and stored in the film cartridge 110.

As shown in FIG. 3, an IC memory unit 20 is provided at one side (reference side) of the film cartridge 110. The IC memory unit 20 consists of a printed circuit board with six contact patterns and an IC memory (e.g., a flash memory), which is loaded on the printed circuit board and is electrically connected to the six contact patterns. The IC memory contains image data, etc. which requires a large memory capacity as described later.

FIG. 4 is a block diagram illustrating an example of the inner structure of the film player 100. The film player 100 is comprised mainly of an illumination light source 130, a taking lens 136, a CCD circuit 140 including a CCD line sensor 142, a first signal processing circuit 151, a second signal processing circuit 152, a third signal processing circuit 153, a memory control circuit 154, a CCD buffer M1, a display buffer M2, a central processing unit (CPU) 160, a film driving mechanism 170, an optical data reading unit 180, and a magnetic recording and regenerating unit 182.

The light source 130 is, for example, a long fluorescent lamp which is provided in a direction perpendicular to the feed direction of the film 114. The light source 130 illuminates the film 114 through an infrared cut filter 132. An image light is transmitted through the film 114, and it is formed on a light receiving surface of the CCD line sensor 142 through a taking lens 136. While the CCD line sensor 142 is imaging film images, the film driving mechanism 170 moves the film 114 at a constant speed in a direction indicated by an arrow A (forward direction) or B (reverse direction). This will be described later in further detail.

The CCD line sensor 142 is arranged in a direction perpendicular to the film feed direction. The image light, which is formed on the light receiving surface of the CCD line sensor 142, is electrically charged for a predetermined period in sensors provided with R, G and B filters. The image light is converted into R, G and B signal electric charges with quantity suitable for the intensity of light. The accumulated signal electric charges are read to a shift register by a lead gate pulse of a predetermined cycle, which is transmitted from a CCD drive circuit 144. A register transfer pulse reads the signal electric charges sequentially.

The CCD line sensor 142 has 1024 pixels in a direction perpendicular to the film feed direction. If there is no change in the cycle of the lead gate pulse, etc. of the CCD drive circuit 144, the number of pixels in one frame, in the same direction as the film feed direction, varies according to the film feed speed. In this embodiment, the number of pixels at a speed which is ½, 1, 8, and 16 times as fast as the film feeding speed at which a normal film image is captured are 1792 pixels, 896 pixels, 112 pixels and 56 pixels, respectively.

The signal electric charges read from the CCD line sensor 142 are clamped by a CDS clamp and are transmitted as R, G and B signals to an analog processing circuit 146, which controls the gains, etc. of the R, G and G signals. The R, G and B signals, which are output from the analog processing circuit 146, are dot-sequenced by a multiplexer 148, and are converted into digital signals by an A/D converter 150. The digital signals are transmitted to the first signal processing circuit 151 and the CPU 160.

The first signal processing circuit 151 has a white balance adjusting circuit, a negative/positive inversion circuit, a γ-correction circuit, a RGB simultaneously-output circuit, etc. The first signal processing circuit processes the dot-sequential R, G, B signals properly, and simultaneously outputs the R, G and B signals to the second signal processing circuit 152.

A detailed description will now be given of the white balance adjustment, the negative/positive inversion and the γ-correction. The CPU 160 calculates the gradations (the gradation of 10 bit (0–1023) in this embodiment) of the R, G and B digital image signals in a predetermined integration area, and finds the average gradations of the integration area. Thus, the CPU 160 creates each gradation data for the integration area with 5000–10000 points per one screen. Further, the CPU 160 counts the frequency for each gradation in accordance with the sequentially-created gradation data, and stops counting if the frequency exceeds a threshold TH established for the total points of the gradation data (1% of the total points in this embodiment). Specifically, an integration block creates a simple histogram (indicated by a slant line in FIG. 5) by counting the frequency up to the maximum threshold TH for all gradations from 0–1023 as shown in FIG. 5. In FIG. 5, the long and short alternate lines indicate a histogram in the case that the total points are counted.

The CPU 160 sequentially accumulates the frequencies from the smallest gradation of the simple histogram in FIG. 5, and finds the reference minimum value, which is the gradation when the accumulated frequency first corresponds to, or exceeds, the threshold TH, for each of the R, G and B colors. The CPU 160 also sequentially accumulates the frequencies from the largest gradation of the simple histogram and finds the maximum reference value, which is the gradation when the accumulated frequency first corresponds to, or exceeds, the threshold TH, for each of the R, G and B colors.

A description will now be given of the processing in the first signal processing circuit 151. First, a description will be given of a method of calculating the offset values and the quantity of gain, which are used for adjusting the white balance and the black balance. The CPU 160 calculates the offset values for the R, G and B colors in accordance with the reference maximum value and the reference minimum values and calculates the quantity of gain for the R, G and B colors. If the reference maximum value of the R digital image signal is $R_{ref\,max}$ and the reference minimum value of the R digital image signal is $R_{ref\,min}$, the offset value and the quantity of gain are as follows:

$$\text{The offset value} = 1023 - R_{ref\,max}; \quad (1)$$

$$\text{The quantity of gain} = 1023/(R_{ref\,max} - R_{ref\,min}). \quad (2)$$

The offset value and the quantity of gain of R digital image signal are calculated by the above equations (1) and (2), and the other color channels are calculated in the same manner. The R, G and B digital image signals are represented in 10 bit, and 1023 is the maximum value of the R, G and B digital image signals.

The offset value of the R digital image signal is added to the original $R_{org}$ output from the A/D converter 150 during the scanning as shown in the following equation to acquire a digital image signal R1 which is black-point offset:

$$R1 = R_{org} + \text{offset value}. \quad (3)$$

Figure 6A:
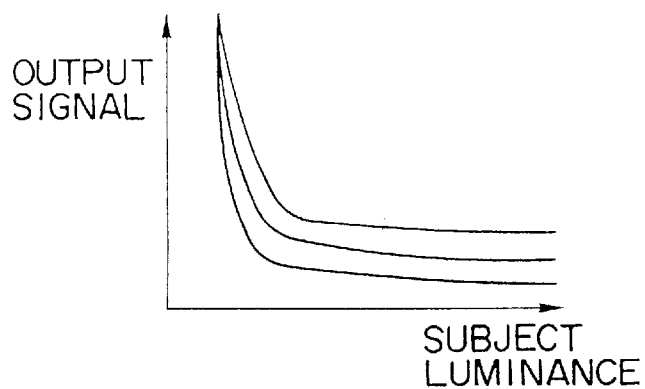
FIGS. 6(A), 6(B), 6(C) and 6(D) are graphs showing the processing at each part of a digital signal processing circuit in FIG. 4.

The originals of the G and B image signals are processed in the same manner so that the peak values of the R, G and B digital image signals can correspond to one another (see FIG. 6(A)).

Figure 6B:
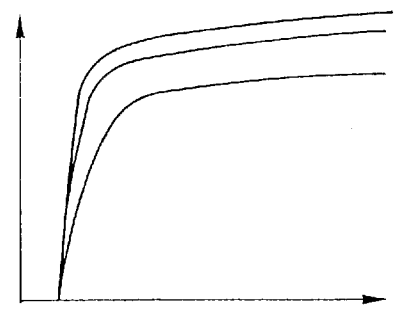

The following equation is calculated for the offset digital image signal R1 in order to negative-positive invert the digital image signal R1 (see FIG. 6(B)):

$$R2 = 1023 - R1. \quad (4)$$

Figure 6C:
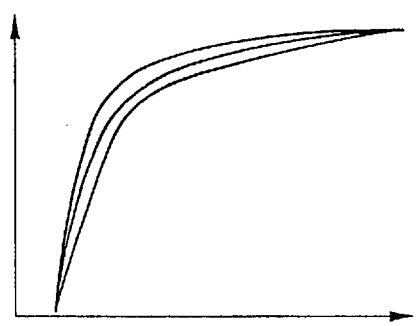

Then, the negative-positive inverted digital image signal R2 is multiplied by the quantity of gain, which is found by the equation (2), so that the other peak values (white in the positive image) of the R, G and B digital image signals can correspond to one another (see FIG. 6(C)):

$$R3 = R2 \times \text{the quantity of gain}. \quad (5)$$

Figure 6D:
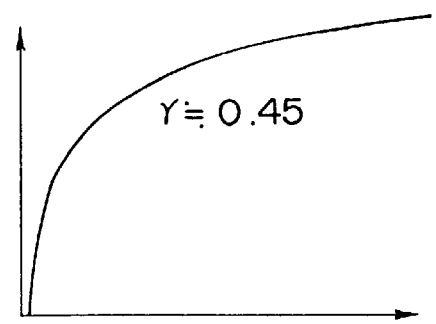

Different gamma corrections are performed for the R, G and B digital image signals that have been multiplied by the quantity of gain, whereby the gray is adjusted (see FIG. 6(D)).

A description will be given of the gamma correction in further detail. First, as shown in FIG. 7, a lookup table (hereinafter referred to as a base LUT), which is a reference for the gamma correction, is prepared.

Figure 7A:
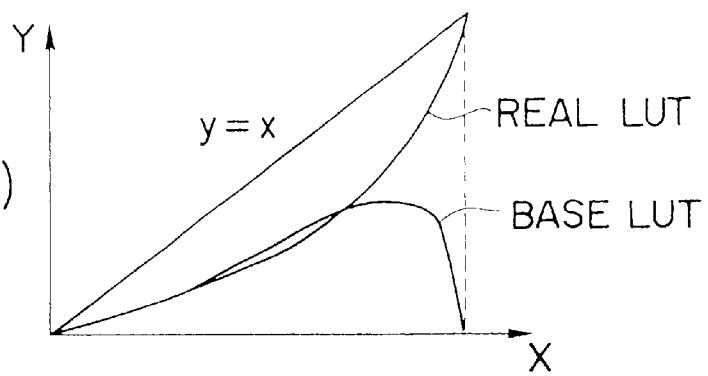
FIGS. 7(A), 7(B), and 7(C) are graphs used for assistance in explaining a gamma correction method.

A gamma correction value, which represents a difference between a gamma curve of the negative film and a gamma curve (generally γ=0.45) of a video signal output to a Braun tube is recorded for each gradation in the base LUT. An actual lookup table representing input-output behavioral characteristics is obtained by subtracting the base LUT (the gamma correction value) from a function y=x as shown in FIG. 7(A).

Figure 7B:
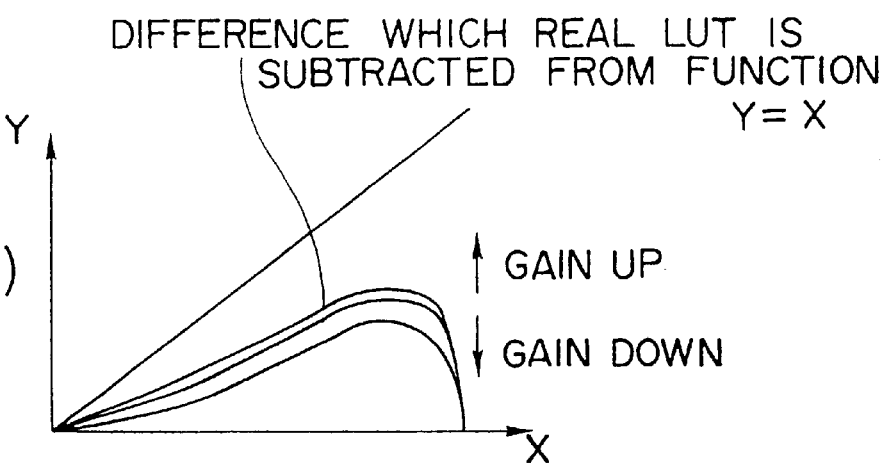
Figure 7C:
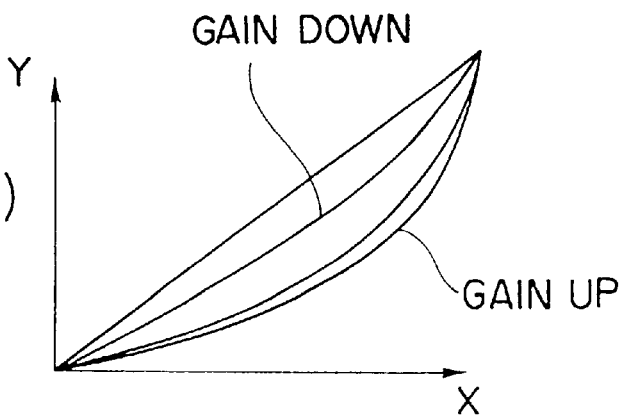

It is possible to change the base LUT by multiplying the base LUT by a gamma gain (see FIG. 7(B)). If one base LUT is multiplied by a proper gamma gain, it is possible to obtain a LUT whose gamma correction values have been expanded or compressed for R, G and B signals. FIG. 7(C) shows the actual LUT for R, G and B signals, which is obtained by subtracting the LUT whose gamma correction values have been expanded or compressed for R, G and B colors from the function y=x.

The white balance and the black balance are adjusted by the above equations (3)–(5). In order to perform the gamma corrections for the dot-sequential R, G and B digital image signals that have been negative-positive inverted, the gamma correction values are read from the base LUT in accordance with the dot-sequential R, G and B digital image signals. The gamma correction values are multiplied by gamma gains for R, G and B colors to find the properly-expanded or compressed gamma correction values. It is possible to perform the dot-sequential gamma corrections for each color by subtracting the expanded or compressed gamma correction values from the dot-sequential R, G and B digital image signals.

The second signal processing circuit 152 in FIG. 4 has a matrix circuit, and generates a luminance signal Y and a chroma signal $C_{r/b}$ in accordance with the received R, G and B signals. Then, the second signal processing circuit 152 outputs the luminance signal Y and the chroma signal $C_{r/b}$ to the memory control circuit 154.

The memory control circuit 154 controls the reading and writing the luminance signal Y and the chroma signal $C_{r/b}$ in the CCD buffer M1, and also controls the reading and writing the luminance signal Y and the chroma signal $C_{r/b}$, which are stored in the CCD buffer M1, in the display buffer M2.

The luminance signal Y and the chroma signal $C_{r/b}$, which are read from the display buffer M2 by the memory control circuit 154, are transmitted to the third signal processing circuit 153. The third signal processing circuit 153 generates, for example, an NTSC color composite video signal in accordance with the received luminance signal Y and the chroma signal $C_{r/b}$, and outputs the color composite video signal to a video output terminal 158 through a D/A converter 156. Incidentally, a synchronous signal generating circuit 159 transmits synchronous signals with a predetermined cycle to the memory control circuit 154, the third signal processing circuit 156 and the D/A converter 156. This synchronizes those circuits, and acquires video signals including necessary synchronous signals. A timing signal generating circuit 162, which is controlled by the CPU 160, transmits timing signals to the CCD circuit unit 140, the A/D converter 150, the first signal processing circuit 151, the second signal processing circuit 152 and the memory control circuit 154, so that the circuits can be synchronized.

The film drive mechanism 170 consists of a film supply part, which connects to the spool 112 of the film cartridge 110 and rotates the spool 112 forward and backward; a film take-up part for taking up the film 114 fed from the film supply part; and a means, which is arranged on a film transport route and feeds the film 114 at a constant speed in the state wherein the film 114 is pinched by the capstan and the pinch roller. The film supply part rotates the spool 112 of the film cartridge 110 clockwise in FIG. 4, and feeds the film 114 from the film cartridge 110 until the film take-up part takes up the film leader.

The optical data reading unit 180 has a first optical sensor 180A for optically detecting the perforations 114A on the film 114, and a second optical sensor 180B for optically reading optical data such as a bar code written at the film edge. The optical data reading unit 180 processes the optical data, which is read through the optical sensors 180A, 180B, and outputs the optical data to the CPU 160.

The magnetic recording and regenerating unit 182 has a magnetic head 182A, and reads the magnetic data from the magnetic recording layer 114B of the film 114. Then, the magnetic data regenerating unit 182 processes the magnetic data and outputs the processed data to the CPU 160 so that the data can be recorded in the RAM 160A. The magnetic recording and regenerating unit 182 also reads the data from the RAM 160A of the CPU 160, and converts the data into a signal suitable for magnetic recording. Then, the magnetic recording and regenerating unit 182 outputs the signal to the magnetic head 182A, and records the signal on the magnetic recording layer 114B of the film 114.

The CPU 160 connects to a random access memory (RAM) 121, a read only memory (ROM) 122, an erasable and electrically programmable read only memory (EEPROM) 123, and an IC memory interface 124.

The ROM 122 contains a film player control program and a load program for loading the contents of the IC memory 120 mounted in the film cartridge 110. In accordance with the program stored in the ROM 122, the CPU 160 performs the processing according to the user's manipulation of the keypad 106 and controls the film player 100. The CPU 160 also loads the contents of the IC memory 120 loaded in the film cartridge 110 through the IC memory interface 124, and writes the data recorded in the RAM 121, the EEPROM 123, etc. in the IC memory 120 through the IC memory interface 124.

A description will be given of the data recorded in the IC memory 120 of the film cartridge 110 in the film player 100. In the first embodiment, the IC memory 120 contains the image data of desired frames, which have been regenerated once by the film player 100. As shown in FIG. 8, the memory area of the IC memory 120 consists of a data management area and a data record area. Image data is recorded in the data record area, and necessary information for reading and regenerating the image data in the IC memory 120 such as frame numbers of the image data recorded in the data record area and the addresses where the image data corresponding to the frame numbers are recorded in the data management area.

Since the image data of desired frames are recorded in the IC memory, it is possible to read the image data of the desired frame from the IC memory 120 and regenerate the image of the desired frames without reading the image with the film scanner when the film player 100 regenerates the film cartridge 110 loaded with the IC memory 120.

A description will now be given of the operation of the film player 100, which is constructed in the above-mentioned manner. First, a description will be given of the operation in the case where the IC memory 120 contains no image data with reference to the flow chart of FIG. 9. When the film cartridge 110 is mounted in the film cartridge storage part 102 (step S10), the CPU 160 determines whether or not the IC memory 120 of the film cartridge 110 contains the required data (image data) with reference to the contents stored in the data management area (see FIG. 8) of the IC memory 120 (step S12). If the required data is not recorded, the CPU 160 controls the film drive mechanism 170, which feeds the film 114 from the film cartridge 110 and winds the film leader around the take-up shaft of the film take-up part (film loading). Then, the negative base at the film leader is captured to execute the calibration (step S14). Specifically, the electronic shutter of the CCD line sensor 142 is set at an initial value 15%, and an amplifier gain of the analog signal processing circuit 146 is set at a preset value (an initial value). Then the CCD line sensor 142 images the negative base at the film leader, and the R, G and B output voltages from the analog processing circuit 146 are measured and memorized. The CPU 160 reads a difference between the reference voltage (e.g., 2V) and the maximum value d of the G output voltage from the analog processing circuit 146, and changes the exposure time (the electric charge accumulation time of the CCD line sensor 142) of the electronic shutter so that the maximum value d can be, for example, 2V. Then, the CPU 160 outputs a gain control signal to the analog processing circuit 146 so that each maximum value of the R and B output voltages can be 2V.

After the calibration, the first pre-scanning is performed (step S16). In the first pre-scanning, the CPU 160 feeds the film 148 forward at a high speed of 148.0 mm/sec. as shown in FIG. 10, and captures the image data through the CCD line sensor 142. The CPU 160 reads the optical data and the magnetic data through the optical data reading unit 180 and the magnetic recording and regenerating unit 182.

In accordance with the image data captured during the first pre-scanning, the CPU 160 finds the reference maximum value and the reference minimum values of the gradation for R, G and B colors. In accordance with the equations (1) and (2), the CPU 160 calculates the offset values and the quantity of gain, and stores offset data representing the offset value for each color and AWB data representing the gain adjustment quantity in the RAM 121. Incidentally, the CPU 160 is capable of detecting each frame on the film 114 in accordance with the optical data and/or the magnetic data, which are read through the optical data reading unit 180 and the magnetic recording and regenerating unit 182, and determining frame numbers by counting the frames.

Next, the second pre-scanning is performed for the film 114 (step S18). Specifically, as shown in FIG. 10, the CPU 160 rewinds the film 114 in a reverse direction at a high speed of 74.0 mm/sec., and captures the image data through the CCD line sensor 142. When the image data is captured, the CPU 160 controls the electric charge accumulation time of the CCD line sensor 142 in accordance with AE data stored in the RAM 121 in order to adjust the exposure for each frame.

The CPU 160 controls the first signal processing circuit 151, which adjusts the offset quantity and the white balance of R, G and B signals for each frame. More specifically, the CPU 160 outputs the offset data for each color signal of each frame from the RAM 121 to the first signal processing circuit 151. In accordance with the offset data, the first signal processing circuit 151 adjusts the offset quantity for dot-sequential R, G and B signals. Likewise, the CPU 160 outputs the AWB data for R, G and B color signals of each frame from the RAM 121 to the first signal processing circuit 151. In accordance with the AWB data, the first signal processing circuit 151 adjusts the gains of the dot-sequential R, G and B signals.

Since the image data of each frame is adjusted in accordance with the AE data, the AWB data or the like, the satisfactory image data can be captured regardless of the photographic conditions for each frame.

The adjusted image data of each frame, that is, the luminance signal Y and the chroma signal $C_{r/b}$ output from the second signal processing circuit 152 are stored in the CCD buffer M1 through the memory control circuit 154. As described above, the film 114 is fed at a speed that is eight times as fast as the feeding speed for capturing the normal film image, and thus, the number of pixels in one frame in the same direction as the film feed direction is smaller than the number of pixels in the normal film image. The CCD line sensor 142 has the sensor of 1024 pixels in a direction perpendicular to the film feed direction as mentioned previously. If the number of pixels is decreased, for example, to $\frac{1}{16}$ of 1024, the number of pixels in one frame in a direction perpendicular to the film feed direction is smaller than the number of pixels in the case of the normal film image. It is therefore possible to store the image data representing an index image of, for example, 40 frames (hereinafter referred to as index image data) in the CCD buffer M1, which is able to contain the image data of only about one frame in the case of the normal film image.

To store the index image data in the display buffer M2, the pixels of one frame is further reduced so that the image data of 20 frames, for example, can be stored in the display buffer M2. To display the index image on the TV monitor 108, the image data is read from the display buffer M2. The CPU 160 numbers the frames 1, 2, . . . in an order of reading the image data during the scanning, and outputs character signals indicating the frame number of each frame to thereby display the index image on which the frame numbers are superimposed.

The index image is created as described above (step S20). If the index image is displayed on the TV monitor 108, the user controls the keypad 106 while looking at the index image. The user interactively performs the edition and designations required for displaying one frame on the TV monitor 108 (step S22). For example, the user designates the direction to erect the regeneration image on the monitor, changes a frame size, and set or cancel the prohibition of the display. The edited data is stored in the RAM 121.

After the editions for displaying the frames are performed on the index image display screen, the frames are displayed and edited. In this case, the user selects frames to be displayed on the TV monitor 108, or selects a regeneration mode for automatically displaying all frame images in order, etc. If the user selects the first frame, the CPU 160 feeds the film 114 by one frame forward at a speed of 9.25 mm/sec as shown in FIG. 10 in order to scan the first frame (main scanning) (step S24). During the main scanning, the image data is captured into the CCD buffer M1 through the CCD line sensor 142.

When the image data is captured, the CPU 160 adjusts the image data of each frame in accordance with the AE data, AWB data, etc., stored in the RAM 121; therefore, a satisfactory image data can be captured regardless of the photographic conditions for each frame.

The image data of one frame, which has been captured in the CCD buffer M1 as stated above, is transferred to the display buffer M2. The contents of the display buffer M2 are read repeatedly so that the image of one frame can be displayed on the TV monitor 108.

The user edits the image in further detail such as trimming and color correction while looking at the screen displayed for each frame (step S26).

The display and edition of each frame are repeatedly performed in accordance with the user's designation of the frames or the like. When the user instructs the operation to finish (step S28), the film 114 is fed in a reverse direction at a high speed of 148.0 mm/sec. as shown in FIG. 10. While the film is feeding, the data, which was previously read from the magnetic recording layer 114B of the film 114 and is stored in the RAM 121 of the CPU 160, is recorded in the magnetic recording layer 114B of the film 114. The required data is recorded in the IC memory 120, and after rewinding, the film cartridge 110 is taken out (step S29).

A description will be given of the operation of the film player 100 in the case where the image data of each frame on the film 114 can be recorded in the IC memory 120 of the film cartridge 110. First, a description will be given of the procedure for recording the image data in the IC memory 120 by the film player 100 with reference to the flow chart of FIG. 11. When the film cartridge 110 is mounted in the film cartridge storage part 102 (step S30), the CPU 160 reads the data from the IC memory 120 and determines the residual capacity of the IC memory 120. The CPU 160 records the residual capacity of the IC memory 120 in the RAM 121 (step S32). The residual capacity is the residual capacity of the data recording area (see FIG. 8); the residual capacity may be confirmed from the memory management information in the data management area (see FIG. 8).

Figure 9:
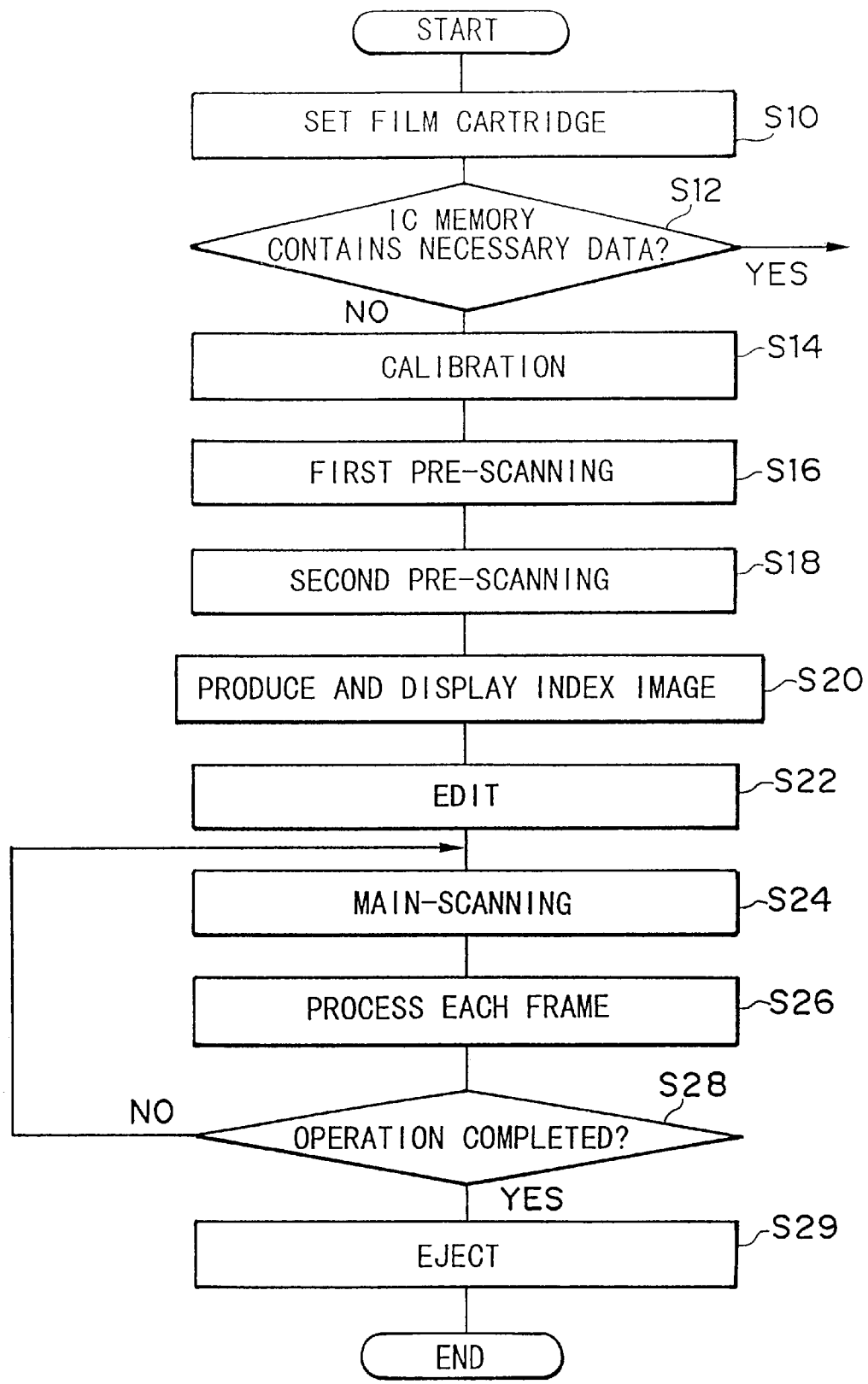
FIG. 9 is a flow chart showing the operation of a film player in the case that no required data is recorded in the IC memory.

Then, the CPU 160 determines whether the required data (image data) is recorded in the IC memory 120 as indicated at the step S12 in the flowchart of FIG. 9. If the image data is not recorded, the CPU 160 performs the processing from the step S14 in the flowchart of FIG. 9 as stated previously. On the other hand, if the image data is recorded, the CPU 160 executes a predetermined processing and then executes the processing from the step S14 in the flowchart of FIG. 9. A description will later be given of the processing procedure in the case where the IC memory 120 contains the image data.

After executing the processing from the step S14, the CPU 160 goes to the step S26 in the flowchart of FIG. 9 so as to display and edit each frame. When the user instructs the image data of a currently-displayed frame to be registered in the display and edition of each frame (step S34), the CPU 160 reads the residual capacity of the IC memory 120 from the RAM 121. The CPU 160 determines whether the residual capacity of the IC memory 120 is larger than the capacity required for recording the image data of one frame so as to determine whether it is possible to register the image data in the IC memory 120 (step S36). If it is possible to register the image data in the IC memory 120, the CPU 160 reads the image data of the designated frame recorded in the CCD buffer M1, and records the image data and other management information in the free space in the IC memory 120 (step S38). The image data is recorded in the data recording area of the IC memory 120, whereas the other management information such as the frame number of the recorded image data and the address of the image data in the memory are recorded in the data management area (see FIG. 8). The quantity of the image data recorded in the IC memory 120 is subtracted from the residual capacity of the IC memory 120, which is recorded in the RAM 121, in order to update the residual capacity of the IC memory 120 before the registration of the image data to the residual capacity after the registration of the image data (step S40).

On the other hand, if it is impossible to register the image data in the IC memory 120 at the step S36, the user determines on the monitor whether to erase the other data stored in the IC memory 120 (step S42). If the user determines not to erase the data, the registration of the image data is cancelled and the processing returns to the step S34. If the user determines to erase the data, he or she determines which data will be erased (step S44). For instance, if the unnecessary image data is erased when other image data is recorded, the residual capacity for recording new image data can be secured. The CPU 160 erases the designated data from the IC memory 120 (step S46), and adds the capacity of the erased data to the residual capacity of the IC memory 120, which is recorded in the RAM 121 to find the residual capacity of the IC memory 120 after the data is erased (step S48). Then, the CPU 160 returns to the step S36, and determines again whether it is possible to register the image data in the residual capacity of the IC memory. If possible, the image data is recorded in the IC memory 120 as stated above. If the residual capacity is still in shortage after the data is erased, the processing from the step S42 to S48 is repeated.

The CPU 160 records the image data, which is read into the CCD buffer M1 when the images are displayed and edited on a frame-by-frame basis, in the IC memory 120 in accordance with the instruction of the user. If the residual capacity of the IC memory 120 is smaller than the capacity required for recording the image data, the CPU 160 gives the user an instruction to erase the unnecessary data in order to secure the residual capacity for recording the image data.

The image data may also be recorded in the IC memory 120 by designating a plurality of frames at the same time on the index image display screen. Moreover, the index image itself may be recorded with the image data of each frame in the IC memory 120.

In the above explanation, the image data captured into the CCD buffer M1 is recorded in the IC memory 120, but the image data (the image data which has been trimmed or the like) transferred from the CCD buffer M1 to the display buffer M2 may also be recorded in the IC memory 120.

There is no problem if the capacity of the IC memory 120 is enough to contain the image data of all frames, which has been read into the CCD buffer M1. If, however, the capacity of the IC memory 120 is not enough to contain the image data of all frames, which has been read into the CCD buffer M1, it is possible to select frames, which the user would like to store, among frames which may be recorded in the IC memory 120. It is also possible to reduce or compress the image data in the CCD buffer M1 according to the number of frames designated by the user in order to record the image data of the designated frames. It is also possible to previously set the reduction or compression rate for the image data according to the capacity of the IC memory in order to record the image data of all frames.

If, for example, the data recording area in the IC memory 120 of 2M bytes is 1.5M bytes and the quantity of the image data in each frame is 1M byte, the quantity of the image data is reduced to about 1/7, because 10/1.5=7, in order to record the image data of ten frames in the IC memory 120.

The user may adjust the reduction quantity or compression rate for the image data according to the residual capacity of the IC memory 120 instead of adjusting the quantity of the image data by designating the number of frames to be recorded in the IC memory 120. For instance, a plurality of modes such as a high resolution mode, a normal mode and a low resolution mode are provided as image data recording modes, so that the reduction quantity and compression rate can be selected by designating a mode. In this case, for example, the number of frames that may be recorded is displayed, and the user selects a mode in accordance with the purpose.

If the quantity of the image data to be recorded in the IC memory 120 is changeable as stated above, the quantity of the image data varies according to frames sometimes. If the kind of processing which has been performed to reduce the quantity of each image data is unknown, the image data cannot be restored to the original size. To avoid such a problem, the kind of processing which has been performed to reduce the quantity of data is recorded with the image data in the data management area in the IC memory 120.

Figure 12:
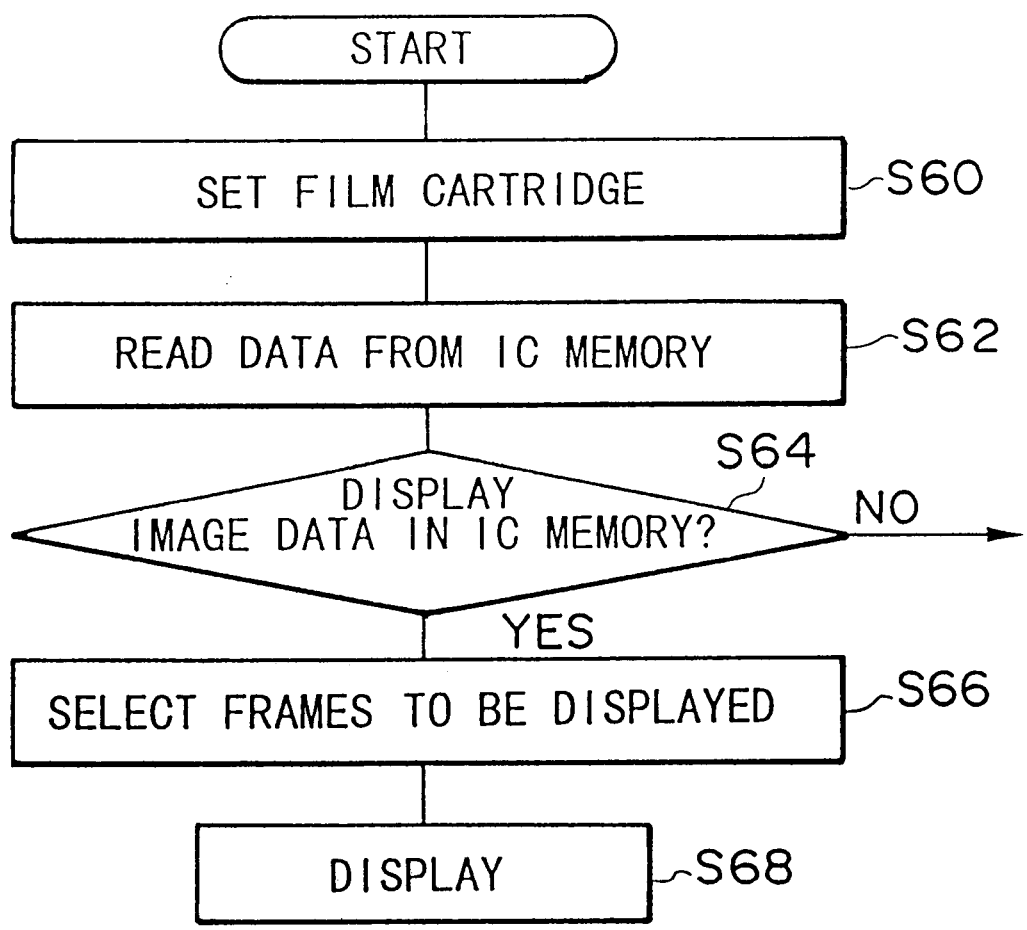
FIG. 12 is a flow chart showing a procedure in the case that the image data is recorded in the IC memory.

A description will now be given of the procedure in the case when the image data is recorded in the IC memory 120 with reference to the flowchart of FIG. 12. When the film cartridge 110 is set in the film cartridge storage part 102 (step S60), the CPU 160 reads the data recorded in the IC memory 120 of the film cartridge 110 (step S62). At this time, the CPU 160 determines whether or not the image data is recorded in the IC memory 120 with reference to the data recorded in the data management area in the IC memory 120. If the image data is not recorded, the CPU 160 performs the processing from the step S14 in the flowchart of FIG. 9 as stated previously.

On the other hand, if the image data is recorded, the CPU 160 displays, on the TV monitor, a selection screen for deciding whether to display the image data in the IC memory 120 on the monitor or to scan the film (step S64). If the user decides to scan the film 114, the CPU 160 performs the processing from the step S14 in the flowchart of FIG. 9. On the other hand, if the user decides to display the image data, the CPU 160 displays frame numbers of the image data recorded in the IC memory 120 on the monitor with reference to the data management area in the IC memory 120, and instructs the user to select a frame to be regenerated (step S66). When the user selects a frame to be regenerated, the CPU 160 reads the image data of the selected frame from the IC memory 120 and displays the image on the TV monitor 108 through the display buffer M2 (step S68).

It is therefore possible to display the image of a certain frame on the TV monitor 108 without removing the film from the film cartridge 110. Consequently, the deterioration of the film is prevented, and the frame images on the film are displayed on the TV monitor 108 within a short period of time.

If the index image is recorded in the IC memory 120, the CPU 160 reads the index image from the IC memory 120 after the film cartridge 110 is mounted in the film cartridge storage part 102. Then, the CPU 160 displays the index image on the TV monitor 108.

A description will now be given of the second embodiment which makes it possible to record setup data of each frame, regenerated once by the film player 100, in the IC memory 120 of the film cartridge 110. The setup data consists of main scan data and calibration data. The main scan data is required to image and display each frame image on the monitor. More specifically, the main scan data includes the accumulation time of electric charge in the CCD line sensor 142, which is obtained during the regeneration of each frame image; the reference maximum value and the reference minimum value of the gradation in each color during the accumulation of the electric charge; and the amplifier gain of the LUT in each color. In other words, the main scan data includes the exposure time of the electronic shutter during the regeneration of each frame image and the color correction data used for determining the offset value, the quantity of gain and the gamma correction quantity.

The calibration data includes the accumulation time of the electric charge in the CCD line sensor 142 for imaging the negative base at a predetermined brightness when the negative base on the film 114 is imaged, and a convergent value of a signal in each color, which is obtained during the accumulation of the electric charge. The calibration data indicates the characteristics of the imaging optical system of the film player, which has recorded the setup data. For example, the calibration data is used to calibrate the changes in the apparatus from the recording of the setup data to the regeneration of the image and differences in characteristics between apparatuses if different apparatuses record the setup data and regenerate the image.

Since the setup data is recorded in the IC memory 120, the setup data can be read from the IC memory 120 when each frame image is regenerated. It is therefore possible to immediately regenerate each frame image without pre-scanning the film to acquire the setup data.

Figure 13:
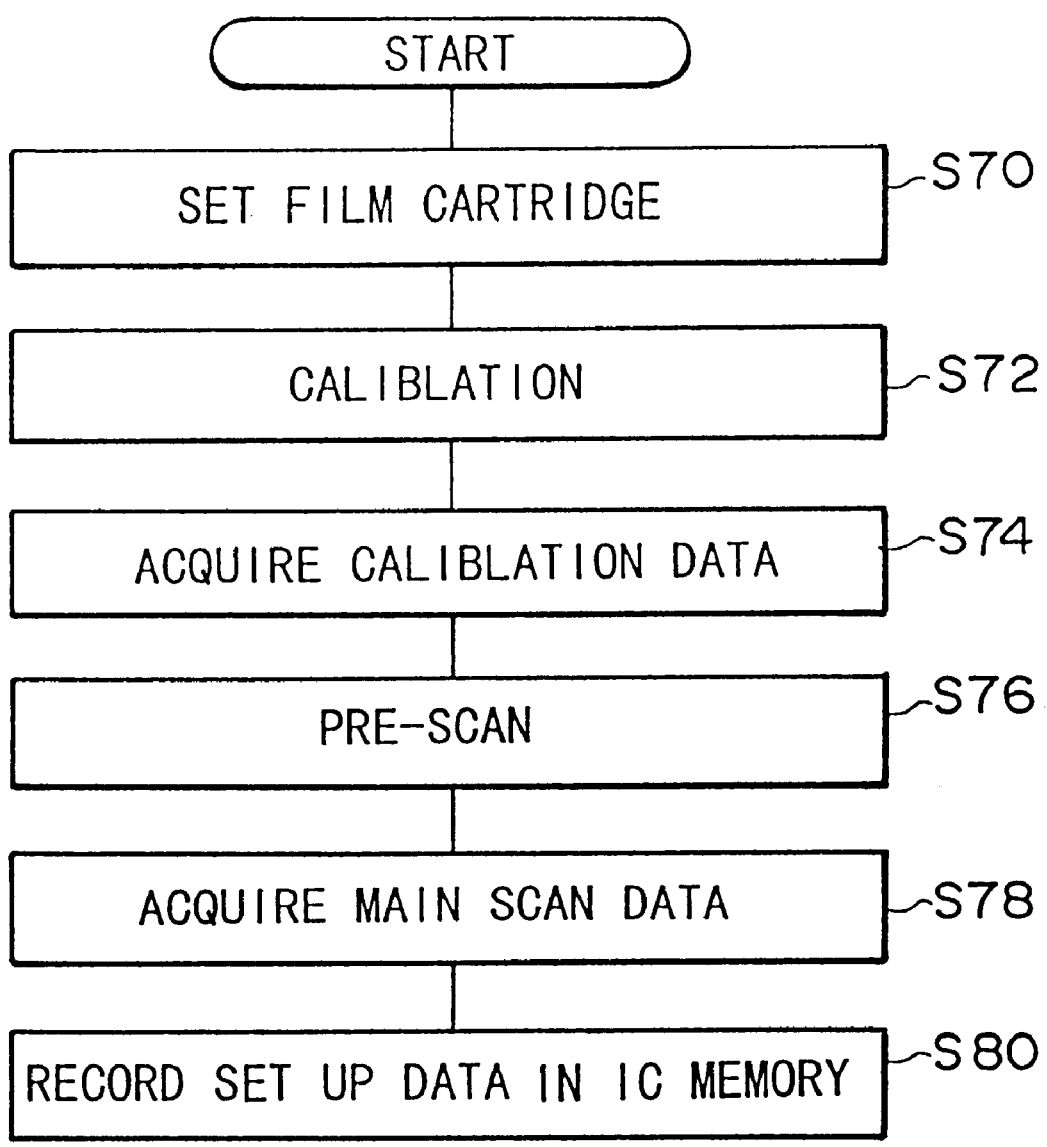
FIG. 13 is a flow chart showing a procedure for recording setup data in the IC memory.
Figure 14:
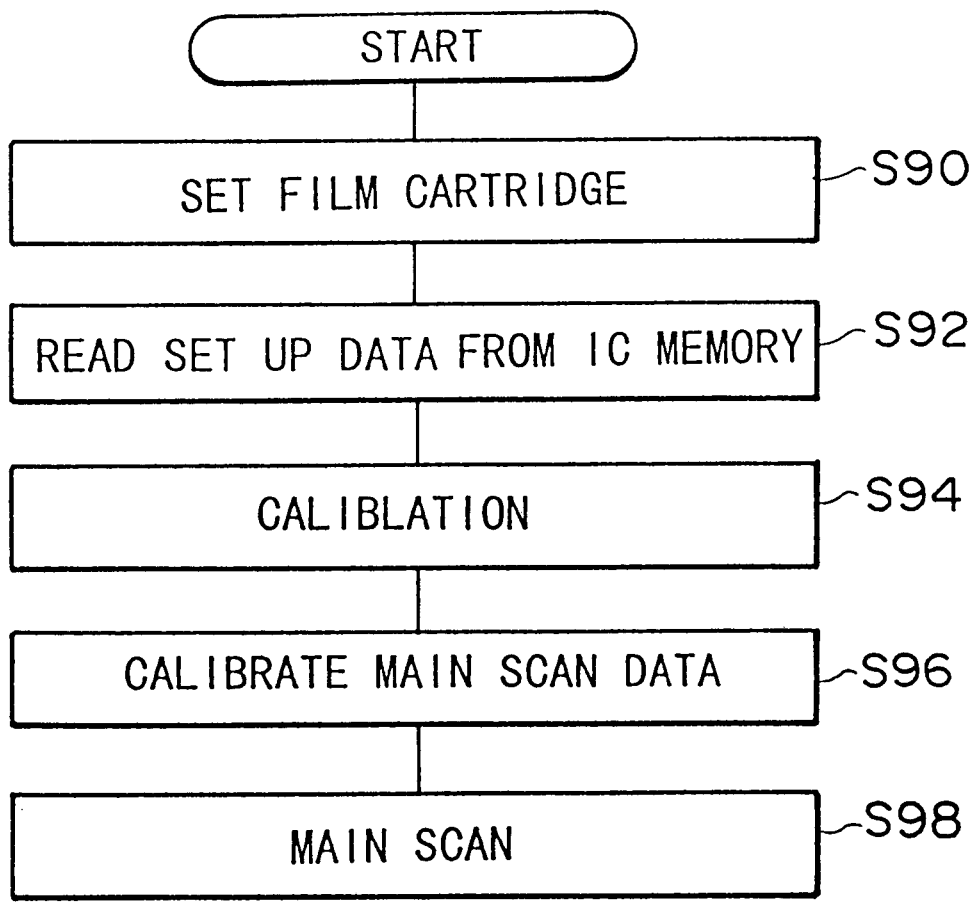
FIG. 14 is a flow chart showing a procedure in the case that the setup data is recorded in the IC memory.

First, a description will be given of the procedure for recording the setup data in the IC memory 120 by the film player 100 with reference to the flowchart of FIG. 13. When the film cartridge 110 is set in the film cartridge storage part 102 (step S70), the CPU 160 reads the data in the IC memory 120 to determine whether the setup data is recorded or not. If the setup data is not recorded, the CPU 160 executes the processing from the step S14 in the flowchart of FIG. 9. On the other hand, if the setup data is recorded, the CPU 160 performs a predetermined processing. A description will later be given of the processing in the case where the setup data is recorded.

If the setup data is not recorded, the CPU 160 performs the processing from the step S14. The CPU 160 executes the calibration for the negative base of the film 114 as stated previously (step S72) to acquire the calibration data (step S74). Afterwards, the CPU 160 performs the first and second pre-scanning as shown in the flowchart of FIG. 9 (step S76) to acquire the main scan data (step S78). After the predetermined processing, the CPU 160 records the setup data, which consists of the calibration data and the main scan data, in the IC memory 120 (step S80).

A description will now be given of the procedure in the case where the setup data is recorded in the IC memory 120. When the film cartridge 110 is set in the film cartridge storage part 102 (step S90), the CPU 160 reads the data in the IC memory 120 to determine whether the setup data is recorded or not. If the setup data is recorded, the setup data is read (step S92). Then, the film is loaded, and the negative base is imaged to perform the calibration (step S94). Then, the results of the calibration and the calibration data included in the setup data are compared to calibrate the main scan data (step S96).

A description will be given of the calibration for the main scan data in further detail. Suppose that the calibration data included in the setup data recorded in the IC memory 120 is as follows:

the accumulation time $T_0$ of the electric charge in the CCD: 300 $\mu$s; and the convergent value $R_0$: 950, $G_0$: 950, $B_0$: 950, and the main scan data of the first frame is as follows:

the accumulation time T of the electric charge in the CCD: 600 $\mu$s;

the maximum value $R_{max}$: 900, $G_{max}$: 920, $B_{max}$: 910;

the minimum value $R_{min}$: 50, $G_{min}$: 60, $B_{min}$: 50; and

γ-gain R: 10, G: 20, B:30.

On the other hand, suppose that the calibration data obtained as a result of the calibration is as follows:

the accumulation time $T'_0$ of the electric charge in the CCD: 150 $\mu$s; and the convergent value $R'_0$: 940, $G'_0$: 940, $B'_0$: 940.

In this case, the accumulation time T' of the electric charge in the CCD line sensor 142 in the main scanning for each frame is calculated by the following equation:

$$T'=T\times(T'_0/T_0).$$

Accordingly, the accumulation time T' of the electric charge in the CCD line sensor 142 for the first frame is as follows:

$$T'=600\times(150/300)=300\ \mu s.$$

The reference maximum value and the reference minimum value of the gradation in each color are substantially equal if the accumulation time of the electric charge in the CCD line sensor 142 is calibrated. For this reason, the reference maximum value and the reference minimum value do not always have to be calibrated. If they are calibrated, however, the calibrated reference maximum values $R'_{max}$, $G'_{max}$, $B'_{max}$ and the calibrated reference minimum values $R'_{min}$, $G'_{min}$, $B'_{min}$ are as follows.

$$R'_{max}=R_{max}\times(R'_0/R_0);$$

$$G'_{max}=G_{max}\times(G'_0/G_0);$$

$$B'_{max}=B_{max}\times(B'_0/B_0);$$

$$R'_{min}=R_{min}\times(R'_0/R_0);$$

$$G'_{min}=G_{min}\times(G'_0/G_0);\text{ and}$$

$$B'_{min}=B_{min}\times(B'_0/B_0).$$

Accordingly, the reference maximum values $R'_{max}$, $G'_{max}$, $B'_{max}$ and the reference minimum values $R'_{min}$, $G'_{min}$, $B'_{min}$ are as follows:

$$R'_{max}=900\times(940/950)\cong891;$$

$$G'_{max}=920\times(940/950)\cong910;$$

$$B'_{max}=910\times(940/950)\cong900;$$

$$R'_{min}=50\times(940/950)\cong49;$$

$$G'_{min}=60\times(940/950)\cong59;\text{ and}$$

$$B'_{min}=50\times(940/950)\cong49.$$

Incidentally, the γ gains of the main scan data are not corrected.

After the main scan data for each frame is calibrated, the CPU 160 performs the main scanning for the frames designated by the user in accordance with the calibrated main scan data (step S98).

The setup data is recorded in the IC memory 120 and the main scanning is performed for each frame in accordance with the setup data recorded in the IC memory 120, so that the pre-scanning for acquiring the main scan data can be omitted and each frame image can be regenerated within a short period of time.

In this embodiment, the image data or the setup data is recorded in the IC memory 120, but both the image data and the setup data may also be recorded in the IC memory 120. In this case, the main scanning is performed for frames with no image data in accordance with the setup data. This eliminates the necessity for pre-scanning and makes it possible to display the frame image on the TV monitor within a short period of time.

As set forth hereinabove, according to the image data recording method and the frame image regenerating method of the present invention, the image data of each frame is recorded in the storage medium loaded in the film cartridge. For this reason, the images in each frame on the photographic film can be regenerated without removing the film from the film cartridge. This prevents the deterioration of the film and reduces the regeneration time of the frame images. Moreover, the quantity of image data in each frame is changed according to the residual capacity of the storage medium. It is therefore possible to arbitrarily set the number and quality of frame images to be recorded in the storage medium in accordance with the residual capacity of the storage medium.

The setup data required for regenerating each frame image is recorded in the storage medium loaded in the film cartridge, and the setup data is referred to when each frame image is regenerated. It is therefore possible to immediately perform the main scanning for each frame without pre-scanning the film. This prevents the deterioration of the film and reduces the regeneration time of the frame images. Moreover, the setup data is calibrated in accordance with the information acquired by imaging the negative base. Consequently, it is possible to properly regenerate the image in each frame according to the setup data recorded in the storage medium even if there is a change in the apparatus as time passes or even if the different apparatuses record the setup data and regenerate the image in the storage medium.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film cartridge comprising:
    a housing for containing a photographic film exposable in a photographic camera; and
    a storage medium operatively mounted to said housing, said storage medium containing setup data comprising:
        an exposure time T0 of a photographic shutter for imaging at a predetermined brightness a negative base on a developed photographic film;
        an exposure time Ti of a photographic shutter, where i is a frame number, for regenerating at a proper brightness a frame image on the photographic film; and
        color correction data for regenerating in proper color the frame image on the photographic film.

2. The film cartridge of claim 1 further comprising the photographic film, said photographic film being contained in said housing.

3. A film cartridge comprising:
    a housing, a storage medium operatively mounted to said housing, and a photographic film, wherein said storage medium contains setup data comprising:
        an exposure time T0 of a photographic shutter for imaging, at a predetermined brightness, a negative base on said photographic film;
        an exposure time Ti of an electronic shutter for regenerating, at a proper brightness, a frame image from said photographic film; and
        color correction data for regenerating, in proper color, the frame image from said photographic film.

* * * * *